(12) United States Patent
Milligan et al.

(10) Patent No.: US 7,447,677 B2
(45) Date of Patent: *Nov. 4, 2008

(54) SYSTEM AND METHOD FOR ENABLING CLIENT APPLICATIONS TO INTERACTIVELY OBTAIN AND PRESENT TAXONOMY INFORMATION

(75) Inventors: Andrew D. Milligan, Redmond, WA (US); Charles R. Reeves, Jr., Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

This patent is subject to a terminal disclaimer.

(21) Appl. No.: 10/607,812

(22) Filed: Jun. 27, 2003

(65) Prior Publication Data

US 2004/0267718 A1      Dec. 30, 2004

(51) Int. Cl.
G06F 7/00         (2006.01)
G06F 17/30        (2006.01)
(52) U.S. Cl. ............................................. 707/3; 707/6
(58) Field of Classification Search ........................ None
See application file for complete search history.

(56) References Cited

U.S. PATENT DOCUMENTS 6,711,585 B1 *  3/2004  Copperman et al. ...... 707/104.1
6,888,554 B1 *  5/2005  Decombe .................... 345/645
7,181,438 B1 *  2/2007  Szabo .......................... 707/2
2003/0191769 A1 * 10/2003  Crisan et al. ................ 707/100
2004/0093326 A1 *  5/2004  Carson et al. .................. 707/3

* cited by examiner

Primary Examiner—Christian P. Chace
Assistant Examiner—Michael J Hicks
(74) Attorney, Agent, or Firm—Workman Nydegger

(57) ABSTRACT

A system and method for enabling UDDI client applications to interactively obtain taxonomy information from a UDDI server and thereby present that information to a user, such as to enable navigation through the taxonomy. An application programming interface is provided by which a client application sends a unique taxonomy identifier and a relationship qualifier (e.g., root, parent and/or child) to a server. The client may also identify a reference node within the taxonomy. The server receives the (e.g., XML) request message, and extracts the data to query a database based on the relationship qualifier (or qualifiers) and the taxonomy/reference node. Based on the query results, the server returns a response that provides relationship information to the client, such as information on root, parent and/or child nodes that satisfy the request. The client interprets the response to present the taxonomy, such as for user navigation through the taxonomy.

42 Claims, 6 Drawing Sheets

| Taxonomy UUID | Taxonomy Value | Parent Value | isValid |
|---|---|---|---|
| UIID (for Geo.) | World (Value) | *NULL | F |
| UIID (for Geo.) | North America (Value) | World | T |
| ⋮ | | | |
| UIID (for Geo.) | United States (Value) | North America | T |
| ⋮ | | | |
| UIID (for Geo.) | States (Value) | United States | F |
| ⋮ | | | |
| UIID (for Geo.) | Washington (Value) | States | T |
| UIID (for Geo.) | Seattle (Value) | Washington | T |
| UIID (for Postal codes) | United States (Value) | North America | T |

SYSTEM AND METHOD FOR ENABLING CLIENT APPLICATIONS TO INTERACTIVELY OBTAIN AND PRESENT TAXONOMY INFORMATION

FIELD OF THE INVENTION

The invention relates generally to computer systems and networks, and more particularly to distributed services.

BACKGROUND OF THE INVENTION

There are many types of computing services, resources and data that computer users and applications need to manage and otherwise access, such as services and data maintained on corporate networks and other remotely accessible sites including intranets and the internet. As there are many different computing platforms, various platform-independent mechanisms and protocols that facilitate the exchange of network information are becoming commonplace, including HTTP (HyperText Transfer Protocol), XML (extensible Markup Language), XML Schema, and SOAP (Simple Object Access Protocol). The concept of web services, in which businesses, organizations, and other providers offer services to users and applications, is based on these standards. Web services are services that connect applications across an intranet, extranet, or across the Internet, so that these applications can share resources and information. Web services can be offered by any individual or organization that has the tools to create them and make them available to other individuals or organizations online.

To be of value, web services need to enable users and applications to locate them, and exchange the information needed to execute them. To this end, UDDI (Universal Description Discovery & Integration) provides a set of defined services (e.g., in a universal business registry) that help users and applications discover such businesses, organizations, and other web services providers, along with a description of their available web services and the technical interfaces needed to access those services. UDDI thus facilitates the connection between the providers and the consumers of Web services. Although such services may be provided over the internet, services also may be provided in an enterprise environment or other intranet, where the services and their usage may be more controlled. Thus, not just UDDI, but other service registries (such as one based on Microsoft Corporation's Active Directory®) may provide a way of locating a distributed service.

Regardless of the service registry, taxonomies such as those within UDDI may be used to categorize sets of related values in the service registry, in which these values are typically used to categorize entities such as web services or web service providers. These values make up the "nodes" within a taxonomy. The nodes typically offer a hierarchical breakdown of a domain (such as the series of hierarchically arranged nodes in a geographic taxonomy path "World/Europe/UK/Scotland"). Taxonomies may also cover domains where there is no established hierarchy, such as by placing all nodes as peers at the top, or root level.

However, while UDDI provides a valuable technology for locating web services that works in part by providing the ability to categorize UDDI entries, the UDDI specifications provide no standard mechanism for programmatically discovering nodes within a taxonomy, and specifically no support for discovering related nodes. Further, there is no way to discover what is at the root of a given taxonomy. Although it is possible for a client to cache the taxonomy data (via some receiving mechanism outside of UDDI), such data tends to be large, and may be customized and/or change often, making client caching impractical in many, if not most, situations.

As a result, this lack of support significantly hinders navigation around the taxonomy and the presentation of taxonomy-related data. What is needed is a better way for clients to interact with taxonomies, such as UDDI taxonomies, to obtain such information about the taxonomy and the contained nodes and node relationships.

SUMMARY OF THE INVENTION

Briefly, the present invention provides a system and method for enabling UDDI client applications to interactively obtain taxonomy information from a UDDI server and thereby present that information to a user, such as to enable the user to navigate the taxonomy. A mechanism such as an application programming interface (API) is provided by which a client application sends a unique taxonomy identifier and a relationship qualifier to a server. The client may also provide a node identifier within the taxonomy to indicate a reference node for which a related node (or set of related nodes) is being sought. The API may use XML as the message format for the request and the response.

The API provides the requested information to an implementing service in a server (e.g., in a UDDI-based service registry). A request handling mechanism in the server extracts the data provided by the client in order to query a database (which may be any data store) for the relationship information. The request handling mechanism then formats and returns a response based on the results of the database query. The client (e.g., an application program running thereon) then interprets the response and thereby has the capability to enumerate, identify and describe the taxonomy.

If the client provides a root node qualifier, the server returns a root node identifier at the top or "root" level of the specified taxonomy. A taxonomy may have multiple root nodes, in which event the response may include the data for each root node. If the client provides a parent node qualifier and specifies a particular node within the taxonomy, the server returns information about the parent node. If the client provides a child node qualifier and specifies a particular node within the taxonomy, the server returns information about the child node or nodes of the specified node. More than one qualifier can be provided per request, and other relationship qualifiers are possible. The relationship may be with a node in another taxonomy, e.g., to specify one node in a taxonomy and find an equivalent node in another taxonomy.

The response may provide additional details. For example, in a UDDI-based environment, the response will include the unique identifier of the taxonomy, a unique (within the scope of that taxonomy) keyValue that uniquely identifies the node within that taxonomy, a keyName comprising human-readable symbols such as a text string, and an indication (in an isValid attribute) of whether this node is appropriate for classifying entities, or is provided only to provide structure within the hierarchy.

To provide the relationship information, the server maintains a database in the form of one or more tables accessed with keys. One such table includes a taxonomy UUID field, a taxonomy node value field, a parent node value field, and an isValid field. The keyName data may be in another field, or may be kept as an offset pointer or the like into a structure containing the keyName strings. With this arrangement, given the appropriate keys to identify a taxonomy, and a node therein if a relationship beyond the root node is being sought, a straightforward query can determine root, parent and child relationships, and relationships with the node of another taxonomy. Multiple queries can be used to obtain other relationships. In general, if XML is used, any relationship tag that the client and request handling mechanism both understand and from which the server can detect a relationship may be used to request and obtain data.

With the response data, the client can present a hierarchical view that matches the taxonomy or taxonomies on the server. The client application may allow navigation through the taxonomies, along with displaying information about each node as the user selects a node during navigation.

Other advantages will become apparent from the following detailed description when taken in conjunction with the drawings, in which:

BRIEF DESCRIPTION OF THE DRAWINGS

FIG. 5 is a representation of a data structure maintained at the server for locating relationship information, in accordance with an aspect of the present invention.

DETAILED DESCRIPTION

Exemplary Operating Environment

Figure 1:
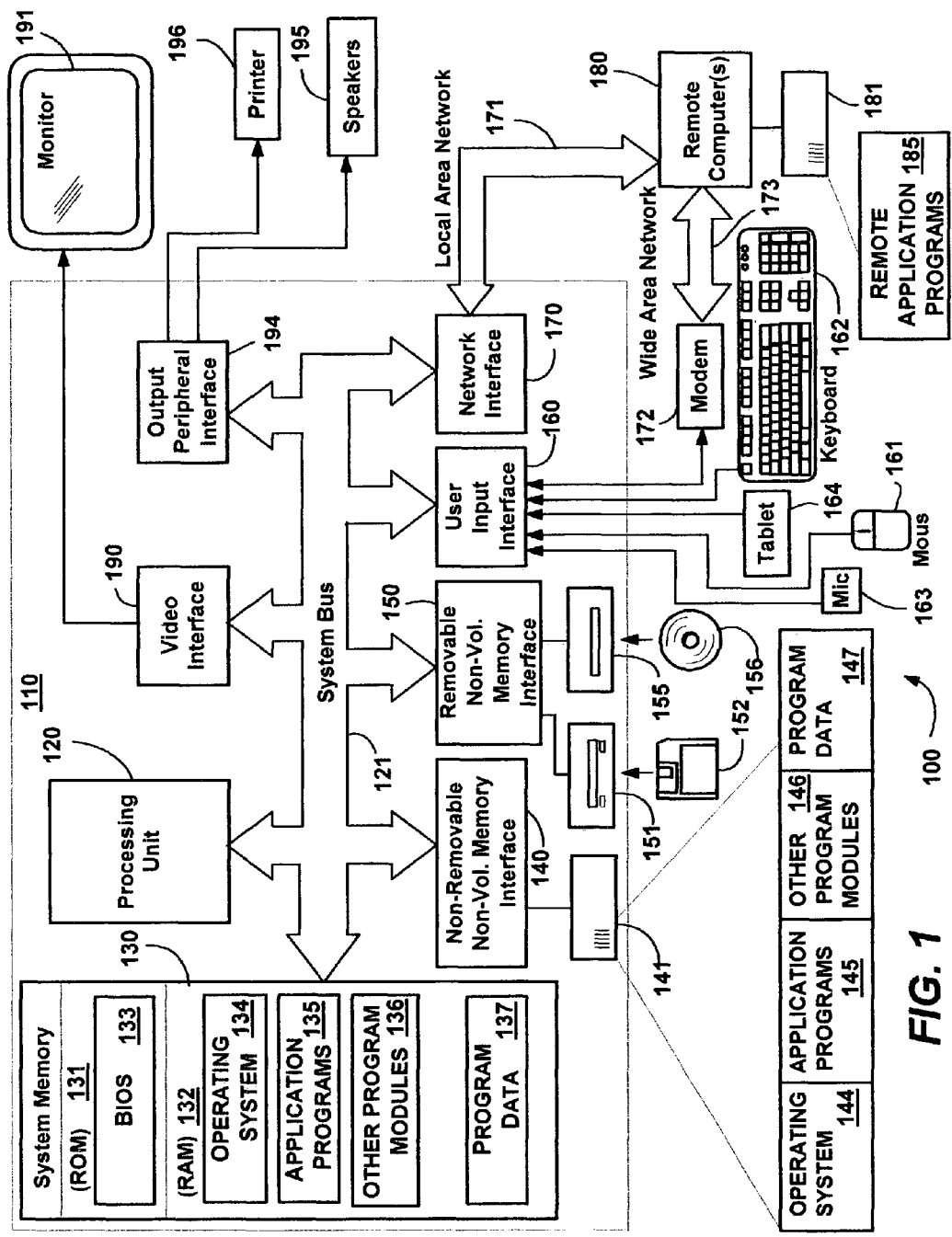
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid-state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism in a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Interactively Obtaining and Presenting Taxonomy Information

The present invention is in part, generally directed towards distributed network services, in which a client running on essentially any platform may use a defined protocol such as SOAP (Simple Object Access Protocol) to access network services over UDDI. However, the present invention is not limited to UDDI, but applies to any technology that handles requests related to information that may be arranged as nodes in a taxonomy. Thus, while the present invention will primarily be described with reference to UDDI and UDDI services, it is understood that the present invention may apply to locating related information in general. Further, while the present invention will be primarily described with respect to SOAP, XML, UDDI, and/or Windows®/.NET, it is understood that the present invention is not limited to any particular implementation, protocols, components, APIs, and so forth, but also encompasses similar mechanisms for interacting over a network. Thus, although the examples herein are related to the UDDI standards, it is understood that the actual invention may be abstracted to provide generic capabilities for navigating hierarchical categorizations on alternate systems.

Figure 2:
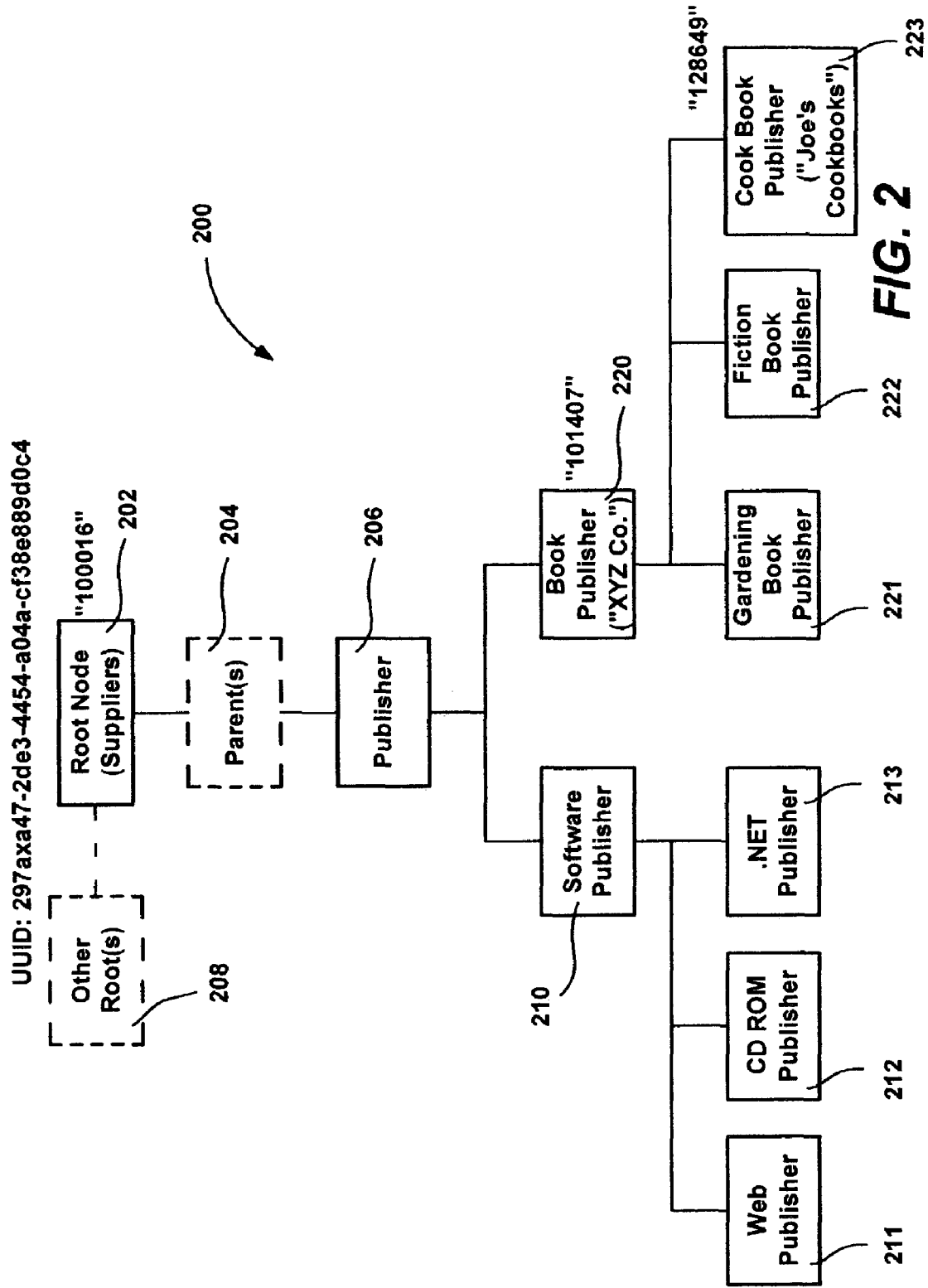
FIG. 2 is a representation of an example taxonomy.

As generally represented in FIG. 2, taxonomies within UDDI provide sets of related values, which may be used to categorize entities such as web services or web service providers. These values make up the nodes within a taxonomy. The nodes typically offer a hierarchical breakdown of a domain, although taxonomies may also cover domains where there is no established hierarchy, e.g., by placing multiple nodes as peers at the top or "root" level. FIG. 2 illustrates one example taxonomy 200, part of which is directed to a publisher-related domain classification.

In FIG. 2, a root node has child nodes which in turn have child nodes until some leaf node is reached in each branch. One of the children of the root comprises a publisher node 206, which in this example taxonomy has child nodes and may have one or more parent nodes 204 between the root and the publisher node 206. Note that in an alternative taxonomy, the publisher node may be the root node. One or more other root nodes 208 are also possible within a taxonomy.

As represented in FIG. 2, as is normal within a hierarchically-arranged taxonomy, the child nodes are narrower classifications with respect to the parent node, and the example shows two more distinct (yet still relatively general) types of publishers, as child nodes 210 and 220 of the publisher node 206. In the example of FIG. 2, these child nodes 220 and 220 in turn are parents having children 211-213 and 221-223, respectively, that each represents a more-specific subset classification of their respective parents.

In general, two fields are used to identify a node within a particular taxonomy within the UDDI specificationsm (tModelKey and keyValue) and three fields are used to describe the node (tModelKey, keyValue and keyName). Further, beyond the UDDI specifications, and isValid attribute is also used to describe an aspect of each node, as described below.

The tModelKey field contains a unique identifier in the form of a Globally Unique Identifier (GUID) to identify the intended taxonomy of values, while the keyValue field contains a node identifier which is unique within the scope of the taxonomy. The keyName field contains a non-unique, textual description of the node. The keyName value is typically a human-readable identifier for the node that is not used for programmatic identification, in part because it is non-unique. An example of these fields such as used to describe the node 223 in the taxonomy 200 of FIG. 2 is set forth below:

```
tModelKey = "uuid:297axa47-2de3-4454-a04a-cf38e889d0c4"
keyValue = "128649"
keyName = "Joe's Cookbooks"
```

This (hypothetical) example uniquely identifies and describes Joe's Cookbooks node value (128649) within a UDDI-based publisher taxonomy uniquely identified as "297axa47-2de3-4454-a04a-cf38e889d0c4". There may be another publisher named Joe's Cookbooks in this same taxonomy 200, but the keyValue (128649) uniquely identifies the publisher in question.

As mentioned above, the UDDI specifications provide no standard mechanism for programmatically discovering nodes within a taxonomy, and thus in the above example, would provide no support for discovering that Joe's Cookbooks is a child of the node Book Publisher with value 101407 (and with KeyName "XYZ Co." within this taxonomy, or that at the root of this taxonomy, there is a "Suppliers" node 100016.

In accordance with an aspect of the present invention, there is provided a mechanism by which a client application may obtain details about the nodes within a taxonomy and the relationships among these nodes, (and possibly relationships with nodes of another taxonomy). Note that as used herein, a "client application" may itself be a server application or another UDDI server variant, that is, the client is any consuming application, and is not necessarily an end-user GUI client application. In one implementation, this mechanism is provided as an application programming interface (API) referred to as the "Related Categories" API. When implemented within Microsoft® UDDI Services, for example, the Related. Categories API uses XML as the message format for the request and the response. More particularly, (using the actual names) in one implementation, the Related Categories API provides a mechanism to interactively obtain details about the nodes within a taxonomy via a single, flexible XML "get_relatedCategories" request message, which returns an XML "categoryList" response message.

Figure 3:
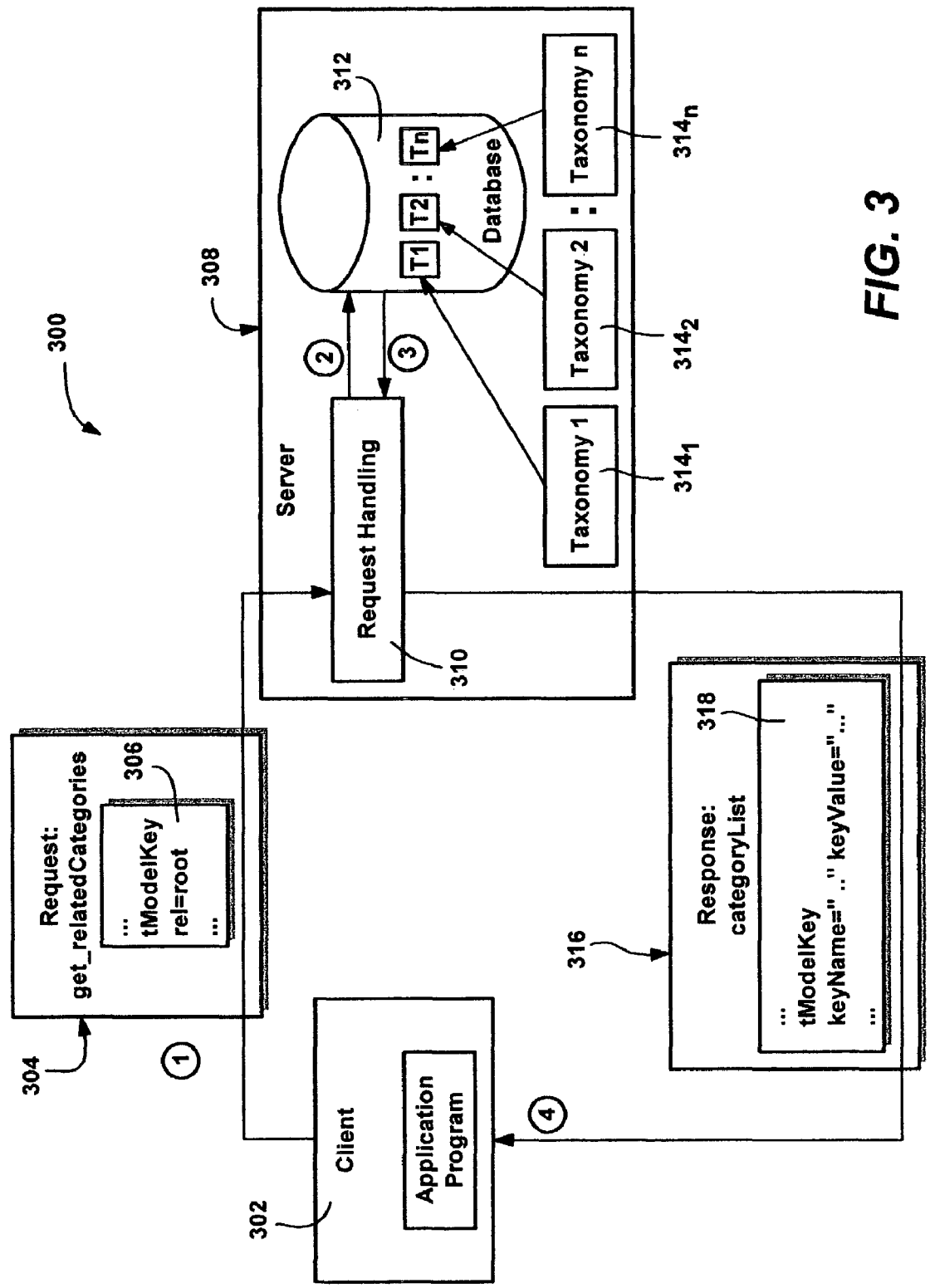
FIG. 3 is a block diagram generally representing a client request for a root of a taxonomy and a server response, in accordance with an aspect of the present invention.
Figure 4:
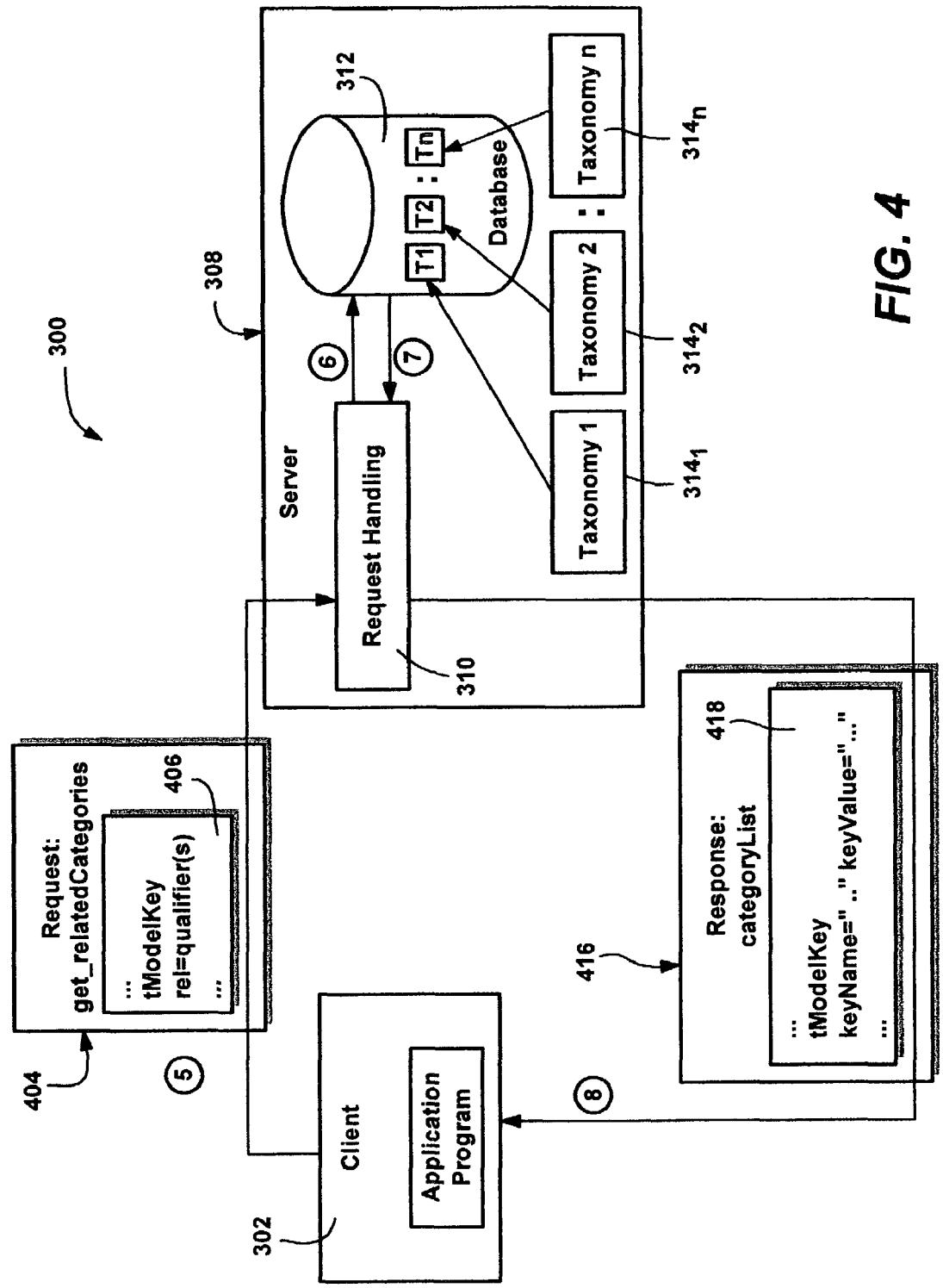
FIG. 4 is a block diagram generally representing a client request for relationship information with respect to a node of a taxonomy, and a server response, in accordance with an aspect of the present invention.

As generally represented in FIGS. 3 and 4, two example ways of using the Related Categories API are described, namely to retrieve root node information, and to retrieve other node relationship information, respectively. First, as represented in FIG. 3, given sufficient details by a client 302 to identify a particular taxonomy, the API 304 provides the requested information 306 to an implementing service in the server 308 (e.g., a UDDI-based service registry). A request handling mechanism 310 in the server 308 retrieves, formats and returns a response 316 including the requested information 318. The client 302 (e.g., an application program running thereon) then interprets the response and thus has the capability to enumerate, identify and describe the node or nodes that are at the top or "root" level of the taxonomy. Note that a taxonomy may have multiple root nodes and the response may include the data for more than one root node.

More particularly, in one implementation, to request the details for the root of a taxonomy, the identifying key for the taxonomy, along with an element specifying the relationship that is being requested, is specified:

```
<get_relatedCategories>
    <category tModelKey=" uuid:297axa47-2de3-4454-a04a-
    cf38e889d0c4">
        <relationshipQualifier>root</relationshipQualifier>
    </category>
</get_relatedCategories>
```

The response message, named categoryList in this example implementation, provides the details for the root node of the specified categorization:

```
<categoryList truncated="false" operator="Microsoft">
    <categoryInfo tModelKey="uuid:297aaa47-2de3-4454-a04a-
    cf38e889d0c4">
        <rootRelationship>
            <categoryValue keyName="suppliers" keyValue="100016"
            isValid="true"/>
        </rootRelationship>
    </categoryInfo>
</get_relatedCategories>
```

To summarize using the data structures in this implementation, the general request-response operation is represented in FIG. 3 by the arrow labeled one (1), where the client provides the request 304 (get_relatedCategories) with details 306. The details include the tModelKey value, and also indicate to the server 308 that the root information is being requested. As generally represented in FIG. 3 by the arrows labeled two (2) and three (3), the request handling mechanism 310 accesses a database table 312. (comprising any suitable data structure) via the tModelKey value to look up the taxonomy root information for the specified taxonomy (e.g., taxonmomy $314_1$ or T1). If located, the request handling mechanism 310 appropriately formats the root node information (e.g., in the categoryList XML structure) 318, and returns the response 316 including the requested root information 318 to the client 302, as represented by the arrow labeled four (4).

Note that the response details 318 include the unique (within the scope of this taxonomy) keyValue, the keyName and an indication (the is Valid attribute) of whether this node is appropriate for classifying entities or is provided only to provide structure within the hierarchy. Other attributes, such as a flag that if set on a node would hide that node's data and/or its existence from clients, are also feasible. Although not shown, if no data is found for the tModelKey value, an appropriate error message or the like may be returned.

As a second example, represented in FIG. 4, the client 302 may also provide sufficient details 406 to identify a node within a particular identified taxonomy, whereby the get_relatedCategories API 404, again in conjunction with the implementing service 308 and request handling process 310, is used to obtain the desired information. In this manner, the client 302 (e.g., the application program running thereon) thus has the capability to enumerate, identify and describe the nodes that are logically related to the specified node. Useful relationships include the parent or children of the specified node. Other relationships include the root node, (which if specified as the only relationship, would be retrieved in a manner similar to that described above with reference to FIG. 3). As described below, in alternative implementations, virtually any relationship that can be defined in such a way that a query or set of queries can determine the results (e.g., siblings, grandparents, grandchildren and the like) may be specified.

The following table sets forth the get_relatedCategories API in the form of an XML request seeking information of related nodes, providing the identifying key for the taxonomy, along with elements specifying the relationships of interest:

```
<get_relatedCategories>
    <category tModelKey="uuid:297aaa47-2de3-4454-a04a-
cf38e889d0c4" keyValue="128649">
        <relationshipQualifier>root</relationshipQualifier>
        <relationshipQualifier>parent</relationshipQualifier>
        <relationshipQualifier>child</relationshipQualifier>
    </category>
</get_relatedCategories>
```

The response message includes the details for the root node of that categorization along with the parent node and any child nodes (in this example none):

```
<categoryList truncated="false" operator="Microsoft">
    <categoryInfo tModelKey="uuid:297aaa47-2de3-4454-a04a-
cf38e889d0c4">
        <rootRelationship>
            <categoryValue keyName"Suppliers" keyValue="100016"
isValid="true"/>
        </rootRelationship>
        <parentRelationship>
            <categoryValue keyName="XYZ Co." keyValue="101407"
isValid="true"/>
        </parentRelationship>
        <childRelationship/>
    </categoryInfo>
</get_relatedCategories>
```

As can be seen from this return message and referring to the hypothetical taxonomy of FIG. 2, the parent of the node with a value of 128649 (the node 223 in FIG. 2 that was specified in the request) is the node having a value of 101407 (named "XYZ Co." and labeled 220 in FIG. 2), with the root named "Suppliers" and having a value of 100016.

In general, a single request (and corresponding response) may be highly flexible in what information is being sought per request. Thus, it is feasible to have a request that spans different taxonomies, has relationship requests for more than one node within a taxonomy, and/or can request different relationship data for the same node. Thus, the details for the related categories for more than one relationship may be specified within the same request as represented in the following example, which shows the XML message for requesting the return of details on the root node for a particular taxonomy identified by the tModelKey "uuid:c0b9fe13-179f-413d-8a5b-5004 db8e5bb2"; the child and parent categories relative to the particular node "51121" within that taxonomy (identified by the tModelKey "uuid:c0b9fe13-179f-413d-8a5b-5004 db8e5bb2"); the root and child categories relative to the particular node "51121" within that taxonomy; and the details for the particular node "51121" within that taxonomy:

```
<get_relatedCategories xmlns="urn:uddi-microsoft-com:api_v2_extensions" xmlns:uddi="urn:uddi-
org:api_v2" xmlns:xsi="http://www.w3.org/2001/XMLSchema-instance" xsi:schemaLocation="urn:uddi-
microsoft-com:api_v2_extensions uddi_v2_extensions.xsd">
    <category tModelKey="uuid:c0b9fe13-179f-413d-8a5b-5004db8e5bb2">
        <relationshipQualifier>root</relationshipQualifier>
    </category>
    <category tModelKey="uuid:c0b9fe13-179f-413d-8a5b-5004db8e5bb2" keyValue=51121">
        <relationshipQualifier>child</relationshipQualifier>
        <relationshipQualifier>parent</relationshipQualifier>
    </category>
    <category tModelKey="uuid:c0b9fe13-179f-413d-8a5b-5004db8e5bb2" keyValue="51121">
        <relationshipQualifier>root</relationshipQualifier>
        <relationshipQualifier>child</relationshipQualifier>
    </category>
    <category tModelKey="uuid:c0b9fe13-179f-413d-8a5b-5004db8e5bb2" keyValue="51121"/>
</get_relatedCategories>
```

The resulting categoryList is an in order collection (sequenced according to the order of requests) of categoryInfo structures:

```
<categoryList xmlns="urn:uddi-microsoft-com:api_v2_extensions" xmlns:uddi="urn:uddi-org:api_v2"
xmlns:xsi="http://www.w3.org/2001/XMLSchema-instance" xsi:schemaLocation="urn:uddi-microsoft-
com:api_v2_extensions
uddi_v2_extensions.xsd" truncated="false" operator="Microsoft">
    <categoryInfo tModelKey="uuid:c0b9fe13-179f-413d-8a5b-5004db8e5bb2">
        <rootRelationship>
            <categoryValue keyName="NAICS Categories" keyValue="10001" isValid="false"/>
        </rootRelationship>
    </categoryInfo>
    <categoryInfo tModelKey="uuid:c0b9fe13-179f-413d-8a5b-5004db8e5bb2" keyName="NAICS: Software
Publisher" keyValue="51121" isValid="true">
        <childRelationship>
            <categoryValue keyName="NAICS: Software CD ROM Publisher" keyValue="15641" isValid="true"/>
            <categoryValue keyName="NAICS: Software Web Publisher" keyValue="12314" isValid="true"/>
            <categoryValue keyName="NAICS: Software .NET Publisher" keyValue="23423" isValid="true"/>
        </childRelationship>
```

```
        <parentRelationship>
            <categoryValue keyName="NAICS: Publisher" keyValue="3728" isValid="true"/>
        </parentRelationship>
    </categoryInfo>
    <categoryInfo tModelkey="uuid:c0b9fe13-179f-413d-8a5b-5004db8e5bb2" keyName="NAICS: Software
Publisher" keyValue="51121" isValid="true">
        <rootRelationship>
            <categoryValue keyName="NAICS Categories" keyValue="10001" isValid="false"/>
        </rootRelationship>
        <childRelationship>
            <categoryValue keyName="NAICS: Software CD ROM Publisher" keyValue="15641" isValid="true"/>
            <categoryValue keyName="NAICS: Software Web Publisher" keyValue="12314" isValid="true"/>
            <categoryValue keyName="NAICS: Software .NET Publisher" keyValue="23423" isValid="true"/>
        </childRelationship>
    </categoryInfo>
    <categoryInfo tModelKey="uuid:c0b9fe13-179f-413d-8a5b-5004db8e5bb2" keyName="NAICS: Software
Publisher" keyValue="51121" isValid="true"/>
</categoryList>
```

Note that in this implementation the response is not required to include the optional parentKeyValue attribute, as the API already provides a mechanism for obtaining the parentKeyValue of any given node. Further, the categoryValue defined as being of type categoryValueType response is not required to include the optional parentKeyValue or the tModelKey attribute, as the API already provides a mechanism for obtaining the parentKeyValue of any given node and the tModelKey can be extracted from the surrounding categoryInfo node. As described above, the isValid boolean attribute signals whether this node is valid for categorization, e.g., in this example the root node of NAICS is not valid for classification. The optional "truncated" attribute is included on the categoryList element to indicate cases in which the server truncated the result set, such as in the case of a large result set. Also, if a taxonomy identifier is provided along with a keyValue having zero relationship qualifiers, the other details for the identified node (e.g., the keyName and isValid attribute) are returned.

The following provides an example XSD (Extensible Schema Definition) language-formatted data structure setting forth the details of the schema:

```
<xs:schema targetNamespace="urn:uddi-microsoft-com:api_v2_extensions" xmlns:uddi="urn:uddi-org:api_v2"
xmlns:xs="http://www.w3.org/2001/XMLSchema" xmlns="urn:uddi-microsoft-com:api_v2_extensions"
elementFormDefault="qualified" attributeFormDefault="unqualified">
    <xs:import namespace="urn:uddi-org:api_v2" schemaLocation="http://www.uddi.org/schema/uddi_v2.xsd"/>
    <xs:complexType name="categoryValueType">
        <xs:attribute name="tModelKey" type="uddi:tModelKey" use="optional"/>
        <xs:attribute name="keyName" type="xs:string" use="optional"/>
        <xs:attribute name="keyValue" type="xs:string" use="optional"/>
        <xs:attribute name="parentkeyValue" type="xs:string" use="optional"/>
        <xs:attribute name="isValid" type="xs:boolean" use="optional"/>
    </xs:complexType>
    <xs:simpleType name="relationshipQualifiersType" final="list">
        <xs:restriction base="xs:string">
            <xs:enumeration value="root"/>
            <xs:enumeration value="parent/>
            <xs:enumeration value="child"/>
        </xs:restriction>
    </xs:simpleType>
    <xs:element name="get_relatedCategories">
        <xs:complexType>
            <xs:sequence>
                <xs:element name="category" maxOccurs="unbounded">
                    <xs:complexType>
                        <xs:sequence>
                            <xs:element name="relationshipQualifier" type="relationshipQualifiersType"
minOccurs="0" maxOccurs="unbounded"/>
                        </xs:sequence>
                        <xs:attribute name="tModelKey" type="uddi:tModelKey" use="required"/>
                        <xs:attribute name="keyValue" type="xs:string" use="optional"/>
                    </xs:complexType>
                </xs:element>
            </xs:sequence>
        </xs:complexType>
    </xs:element>
    <xs:element name="categoryList">
        <xs:complexType>
            <xs:sequence>
                <xs:element ref="categoryInfo" maxOccurs="unbounded"/>
            </xs:sequence>
            <xs:attribute name="truncated" type="uddi:truncated" use="optional"/>
```

-continued

```
            <xs:attribute name="operator" type="xs:string" use="required"/>
          </xs:complexType>
        </xs:element>
        <xs:element name="categoryValue" type="categoryValueType"/>
        <xs:element name="categoryInfo">
          <xs:complexType>
            <xs:complexContent>
              <xs:extension base="categoryValueType">
                <xs:sequence>
                  <xs:element name="rootRelationship" minOccurs="0">
                    <xs:complexType>
                      <xs:sequence>
                        <xs:element ref="categoryValue"/>
                      </xs:sequence>
                    </xs:complexType>
                  </xs:element>
                  <xs:element name="parentRelationship" minOccurs="0">
                    <xs:complexType>
                      <xs:sequence>
                        <xs:element ref="categoryValue" minOccurs="0" maxOccurs="unbounded"/>
                      </xs:sequence>
                    </xs:complexType>
                  </xs:element>
                  <xs:element name="childRelationship" minOccurs="0">
                    <xs:complexType>
                      <xs:sequence>
                        <xs:element ref="categoryValue" minOccurs="0" maxOccurs="unbounded"/>
                      </xs:sequence>
                    </xs:complexType>
                  </xs:element>
                </xs:sequence>
              </xs:extension>
            </xs:complexContent>
          </xs:complexType>
        </xs:element>
</xs:schema>
```

Turning to an explanation of the operation of the server response handling mechanism 310, in general, the categorization relationships are maintained in a database 312 in the form of one or more tables accessed with keys. For example, as represented in FIG. 5, a table 500 shows a taxonomy UUID field, a taxonomy value field, a parent value field, and an isValid field. The keyName data may be in another field, or may be kept as an offset pointer or the like into a structure containing the keyName strings, which may save significant space if a significant number of keyNames are reused. Note that as used herein, the term "database" represents any data structure that is suitable for maintaining a taxonomy store, including LDAP stores.

As is readily apparent from FIG. 5, a straightforward query can determine root, parent and child relationships. For example, to locate a root, a query would specify a UUID as a key and request the record (or needed field's) data for all UUID's have a matching value with a parent equal to *NULL. A relationship request seeking a parent node's data would specify the UUID and the given taxonomy value (to identify the reference node) as keys. A child request would use the UUID and specified taxonomy value to seek all records having the specified UUID in which the taxonomy value in the parent field matched the taxonomy value specified.

While the above examples are directed to root, parent and child relationships, virtually any relationship that may be defined such that the server can determine the appropriate data for the node or nodes is feasible. For example, a grandparent node can seek the parent, and use the resulting parent node data to seek its parent, and so on. Sibling nodes could be found by locating the parent, and then locating that parent's children.

Moreover, the relationship need not be in the same taxonomy. For example, there may be an equivalence relationship between nodes of two taxonomies. For example, a node such as shown as "United States" (actually its value) in the database table 500 appears in the Geography-related taxonomy and the Postal Code-related taxonomy. A query may be arranged to return information (e.g., the different UUID's) based on such an equivalent relationship. For example, a query may be used to obtain the UUID of any taxonomy in which an equivalent node appears, and/or may return the taxonomy and a node value for that equivalent node (along with any other information). In general, if XML is used, any relationship (or other) tag that the client and request handling mechanism both understand (e.g., an <equivalenceRelationship> tag) and from which the server can detect a relationship may be used to request and obtain data.

Figure 6:
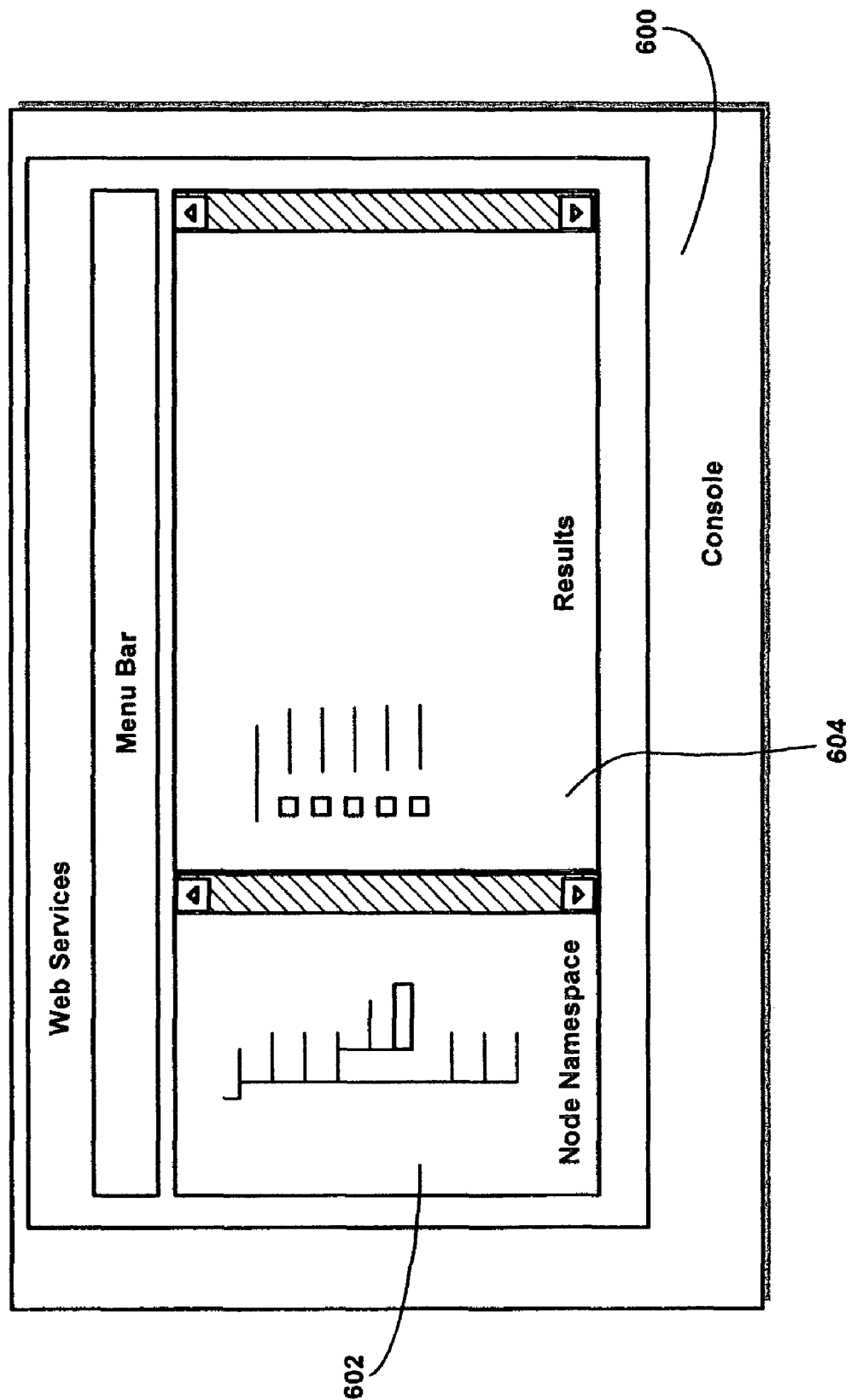
FIG. 6 is a representation of a client application program presenting the received taxonomy information to a user via an example user interface display in accordance with an aspect of the present invention.

Although not necessary to the present invention, a primary purpose for obtaining relationship data at the client is to present it in a meaningful way, such as to allow a user of the client to navigate the taxonomy. FIG. 6 shows one such user interface 600 of a client application, such as a management console program, that uses the returned information to present the taxonomy to a user in some manner. For example, a user may use such a console 600 to effectively navigate the taxonomy, e.g., a hierarchical structure representing the taxonomy may be displayed on a left frame 602, from which a represented node may be selected. Thus, in some applications, the left frame (which also may be referred to as a "scope" pane or a namespace) shows a tree view of the taxonomy or taxonomies, which shows the hierarchy of the nodes that can currently be presented. Thus, any relationships, to the extent known by the client, may be represented in the displayed hierarchy in the left frame 602. Via the present invention, the client application can automatically seek parent and/or child relationship data as the user expands and collapses node representations and scrolls, or in anticipation of such navigation.

The results, corresponding to the data about the selected node, are displayed in a right results frame 604. Essentially anything returned by the server 308 in accordance with the present invention may be included in the results frame 604, e.g., the friendly name, status of the "is valid" attribute, the parent name, any child names and/or other relationships. In this manner, a user can navigate a taxonomy and view relevant information as needed.

As can be seen from the foregoing detailed description, there is provided a method and system by which clients can obtain taxonomy information including relationships, such as for presenting that information to a user. The method and system are straightforward for clients to use, are flexible and operate on demand, thereby rapidly providing access to relevant information, and particularly relationship information, among significant amounts of taxonomy data. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment that includes a network connected client and server database with services organized in a taxonomy, a method for the server database to obtain web service information for one or more related web services represented at different nodes in the taxonomy, the method comprising:

receiving a request for web service information, the request including a user entered reference node identifier and relationship data indicating a first and a second hierarchical relationship the requested node is to have with the reference node, the user entered reference node identifier identifying a specified web service represented at a reference node within the taxonomy, the relationship data indicating that any related web service in any taxonomy having either the first or second specified hierarchical relationship with the specified web service is a related web service of interest to the user;

extracting the reference node identifier and the relationship data from the request;

querying one or more databases in a plurality of different taxonomies located on one or more different computer systems using the relationship data to obtain web service information for any web services having at least one the first and the second specified hierarchical relationship with the specified web service of the reference node, the web service information being presentable in a hierarchical format, the hierarchy being based on the specified web service's hierarchical relationship with the reference node and other web services in the plurality of different taxonomies, the nodes of each database comprising at least one of a plurality of root nodes;

receiving web service information that corresponds to an equivalent node in a second, different taxonomy in response to the query, the equivalent node providing the same web service as the reference node as indicated in an equivalence relationship tag, the received web service information being displayable in a navigable taxonomy; and returning the received web service information to the client, the received web service information for graphical presentation at the client to show a user relevant portions of any of the plurality of taxonomies that included related web services.

2. The method of claim 1 wherein the relationship data indicates a root node relationship, and wherein returning the web service information in response to the request comprises returning an identifier of at least one root node within the taxonomy.

3. The method of claim 2 wherein returning the web service information in response to the request comprises identifying the relationship along with each other node identifier that corresponds to the relationship data.

4. The method of claim 1 wherein returning the web service information in response to the request comprises returning at least one other node identifier that corresponds to the relationship data.

5. The method of claim 4 wherein the relationship data indicates a parent relationship.

6. The method of claim 4 wherein the relationship data indicates a child relationship.

7. The method of claim 4 wherein returning the web service information in response to the request comprises returning an identifier of another taxonomy.

8. The method of claim 7 wherein returning the web service information in response to the request further comprises returning at least one node identifier corresponding to at least one node in another taxonomy.

9. The method of claim 7 wherein the relationship data indicates an equivalence relationship.

10. The method of claim 1 wherein returning the web service information in response to the request further comprises returning at least one attribute value that indicates whether a node corresponding to that attribute value comprises a classification node.

11. The method of claim 1 wherein returning the web service information in response to the request further comprises returning at least one text string.

12. The method of claim 1 wherein the request includes at least one other reference node identifier and relationship data, and wherein the response returns data corresponding to the request in the order in which the reference node identifier and relationship data were received such that the first set of reference node identifier and relationship data corresponds to a first part of the response and the at least one other set of reference node identifier and relationship data corresponds to a second part of the response.

13. The method of claim 1 wherein the request comprises an XML message, and wherein returning the web service information in response to the request further comprises formatting the response as an XML message.

14. The method of claim 1 wherein the web service information corresponds to a taxonomy maintained at a UDDI server.

15. A recordable-type computer-readable storage medium having computer-executable instructions configured to execute the method of claim 1 in a computer system.

16. The method of claim 1, wherein one or more nodes include a flag that, when applied to the node, hides the node's existence from the user.

17. The method of claim 1, further comprising searching for nodes similar to the reference node by category of service.

18. The method of claim 1, further comprising accessing the plurality of databases with one or more keys of a key set.

19. The method of claim 18, wherein the key set comprises a unique identifier of a taxonomy as one key and a node identifier of a node within that taxonomy as another key.

20. The method of claim 1, wherein the received web service information includes information indicating a related node in a third, different taxonomy.

21. The method of claim 1, further comprising graphically displaying the web service information in a navigable taxonomy, allowing the client to manually navigate through each node of the taxonomy.

22. The method of claim 1, wherein the equivalent node has at least one of the first and the second specified hierarchical relationships with the specified web service of reference node.

23. In a computing environment that includes a network connected client and server database with services organized in a taxonomy, a method for the network connected client to obtain web service information for one or more related web services represented at different nodes in the taxonomy, the method comprising:

constructing a request for web service data regarding one or more related web services, the request including a user entered reference node identifier from which a specified web service represented at the reference node within the taxonomy is identifiable and user entered relationship information that identifies at least a first and a second specified hierarchical relationship, wherein the relationship information indicates that any related web service in any taxonomy having either the first or second specified hierarchical relationship with the specified web service is a related web service of interest to the user;

communicating the request to a server;

receiving a response from the server regarding the requested web service data including the specified web service of the reference node and the relationship information indicating at least one related web service having either the first or the second specified hierarchical relationship with the specified web service; and graphically displaying web service information that corresponds to an equivalent web service in a second, different taxonomy in a navigable taxonomy configured to show a user relevant portions of any of the plurality of taxonomies that included an equivalent web service that provides the same web service as the reference node as indicated in an equivalence relationship tag.

24. The method of claim 23 wherein the relationship qualifier indicates a root node relationship with the taxonomy, and wherein the response includes information about at least one root node in the taxonomy.

25. The method of claim 23 wherein the reference node identifier further includes node identification data from which a node within the taxonomy is configured to be identified.

26. The method of claim 25 wherein the relationship qualifier indicates a parent node of a node identified by the node identification data, and wherein the response includes information about the parent node.

27. The method of claim 25 wherein the relationship qualifier indicates a child node of a node identified by the node identification data, and wherein the response includes information about at least one child node, if any exist.

28. The method of claim 25 wherein the relationship qualifier indicates an equivalent node of a node identified by the node identification data.

29. The method of claim 23 wherein receiving the response from the server further includes receiving an attribute value that indicates whether a node in the taxonomy is intended as a classification node.

30. The method of claim 23 wherein receiving the response from the server further includes receiving at least one text string that corresponds to a node in the taxonomy.

31. The method of claim 23 wherein constructing a request for taxonomy data comprises constructing an XML message.

32. The method of claim 31 wherein communicating the request to a server comprises sending the XML message to a UDDI server.

33. A computer-readable storage medium having computer-executable instructions configured to execute the method of claim 23 in a computer system.

34. In a computing environment that includes a network connected client and server database with services organized in a taxonomy, a system that obtains web service information for one or more nodes in a taxonomy, the system comprising:

a request receiving mechanism configured to receiving a request for web service information, the request including a user entered reference node identifier and relationship data indicating a first and a second hierarchical relationship the requested node is to have with the reference node, the user entered reference node identifier identifying a specified web service represented at a reference node within the taxonomy, the relationship data indicating that any related web service in any taxonomy having either the first or second specified hierarchical relationship with the specified web service is a related web service of interest to the user;

an extracting mechanism configured to extract the reference node identifier and the relationship data from the request;

a database querying mechanism configured to query one or more databases in a plurality of different taxonomies located on one or more different computer systems using the relationship data to obtain web service information for any web services having at least one the first and the second specified hierarchical relationship with the specified web service of the reference node, the web service information being presentable in a hierarchical format, the hierarchy being based on the specified web service's hierarchical relationship with the reference node and other web services in the plurality of different taxonomies, the nodes of each database comprising at least one of a plurality of root nodes;

a web service information receiving mechanism configured to receive web service information that corresponds to an equivalent node in a second, different taxonomy in response to the query, the equivalent node providing the same web service as the reference node as indicated in an equivalence relationship tag, the received web service information being displayable in a navigable taxonomy; and a returning mechanism configured to return the received web service information to the client, the received web service information for graphical presentation at the client to show a user relevant portions of any of the plurality of taxonomies that included an equivalent web service that provides the same web service as the reference node as indicated in an equivalence relationship tag.

35. The system of claim 34 wherein the relationship information corresponding to the node in the specified taxonomy comprises a root qualifier.

36. The system of claim 34 wherein the relationship information corresponding to the node in the specified taxonomy comprises a parent qualifier.

37. The system of claim 34 wherein the relationship information corresponding to the node in the specified taxonomy comprises a child qualifier.

38. The system of claim 34 further comprising a database in which the server maintains the web service data

39. The system of claim 34 wherein the web service requests from the client comprise XML messages.

40. The system of claim 34 wherein the response to the client comprises an XML message.

41. The system of claim 34 wherein the server comprises a UDDI server.

42. The system of claim 34 wherein the client provides the request to the server by calling an application programming interface, the application programming interface formatting the request as a message to communicate with the server and returning the response to the client in response to the application programming interface call.

* * * * *